(12) United States Patent
Patton et al.

(10) Patent No.: US 7,093,007 B2
(45) Date of Patent: Aug. 15, 2006

(54) IDENTIFYING A PHYSICAL DEVICE'S AVATAR USING A UNIQUE, SUBSTANTIALLY NON-REMOVABLE COMMUNICATION IDENTIFIER

(75) Inventors: Charles M. Patton, Eugene, OR (US); Stephen A Loughran, Corvallis, OR (US); Rajeev K. Pandey, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1081 days.

(21) Appl. No.: 10/029,338

(22) Filed: Dec. 21, 2001

(65) Prior Publication Data

US 2003/0120718 A1    Jun. 26, 2003

(51) Int. Cl.
*G06F 15/177* (2006.01)
(52) U.S. Cl. ....................... 709/220; 715/706
(58) Field of Classification Search ................ 709/217, 709/219, 220; 715/706
See application file for complete search history.

(56) References Cited

U.S. PATENT DOCUMENTS

| 5,638,517 | A | | 6/1997 | Bartek et al. |
| 5,736,982 | A | * | 4/1998 | Suzuki et al. ................ 715/706 |
| 5,771,354 | A | * | 6/1998 | Crawford .................... 709/229 |
| 6,553,408 | B1 | * | 4/2003 | Merrell et al. .............. 709/213 |

* cited by examiner

*Primary Examiner*—Frantz B. Jean

(57) ABSTRACT

The present invention provides a system and method for automatically linking a physical device and a predetermined associated virtual device to provide the physical device with access to at least one service. The method includes the steps of: manufacturing the physical device that is associated with the predetermined virtual device and attaching, to the physical device, a substantially unremovable communication identifier for communicating with the predetermined virtual device. The communication identifier typically facilitates communication over an information space such as the Internet.

45 Claims, 4 Drawing Sheets

IDENTIFYING A PHYSICAL DEVICE'S AVATAR USING A UNIQUE, SUBSTANTIALLY NON-REMOVABLE COMMUNICATION IDENTIFIER

CROSS REFERENCE TO RELATED APPLICATIONS

The present invention is related to patent applications Ser. Nos. 10/029,070 and 10/028,808, by the same inventors, Charles M. Patton, Stephen A. Loughran, and Rajeev K. Pandey, being filed contemporaneously with the present application.

BACKGROUND OF THE INVENTION

In the past, devices have been manufactured to be freestanding, i.e., to be in final form when they come from the manufacturer. As software implementations became less expensive than hardware implementations, manufacturers found that it became cost-effective to manufacture many devices that could be updated by reloading the devices with updated software. Then, as more devices were utilizing updated software, it became convenient to download the software via telephone or the Internet.

As devices have continued to evolve, there has now become a need for a two-part device that consists of a physical device and a virtual device. The physical device needs to interact with a virtual device so that the virtual device can provide for transfer of ownership to the new owner and can provide additional services to the physical device. In order for such a system to be readily coordinated, there is a need for a virtual device associated with the physical device to be able to be linked to the physical device in a convenient, easy-to-use manner. Thus, there is a need for the physical device to have a permanent Internet address for communication with the associated virtual device, wherein the address is easily ascertainable by the user.

SUMMARY OF THE INVENTION

The present invention encompasses a system and method that provides automatic linking of a physical device and a predetermined associated virtual device. The physical device that is associated with the predetermined virtual device is manufactured and a substantially unremovable communication identifier for communicating with the predetermined virtual device is attached to the physical device.

DETAILED DESCRIPTION OF THE PREFERRED EMBODIMENT

Figure 1:
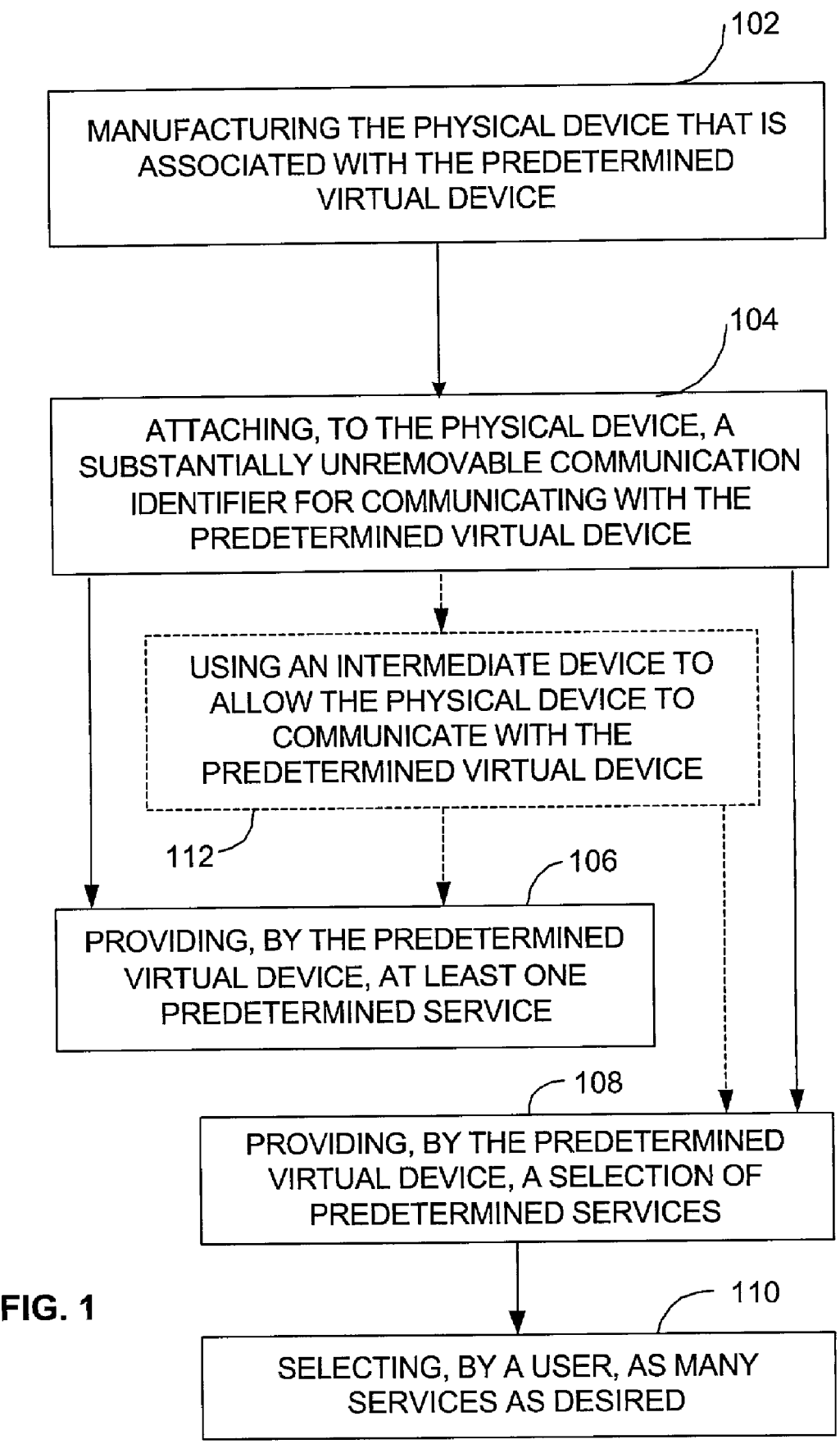
FIG. 1 is a flowchart showing one embodiment of steps in accordance with one embodiment of the method of the present invention.

The present invention provides a method for automatically linking a physical device with a predetermined associated virtual device to obtain services. The method includes the steps of: manufacturing the physical device that is associated with the predetermined virtual device and attaching to the physical device a substantially unremovable communication identifier for communicating with the predetermined virtual device. Typically, the physical device and the predetermined virtual device communicate over an information space such as the Internet.

In another embodiment, the method for automatically providing electronic services for a physical device having a substantially non-removable communication identifier is implemented by manufacturing the physical device with a substantially non-removable communication identifier, followed by utilizing, by a user, the communication identifier to communicate with a predetermined associated avatar to request at least one service.

The invention also provides a system for automatically linking a physical device with a predetermined associated virtual device. The physical device has a substantially unremovable communication identifier in a readily accessible position so that the communication identifier may be used to facilitate communication with the predetermined associated virtual device. When the communication identifier is used to facilitate the communication between the physical device and the predetermined associate virtual device, the physical device may receive at least one predetermined service via the predetermined associated virtual device.

In another embodiment, the invention provides a system for automatically providing electronic services for a physical device that has a substantially non-removable communication identifier located in a readily accessible position of the physical device. The communication identifier is used to facilitate communication of the physical device with a predetermined associated avatar to request at least one service. When the request is received, the at least one service may be activated, or alternatively, if a plurality of services are shown to be available, a user may select the desired services for the physical device.

The present invention provides for local discovery of services associated with a particular physical device that remains valid independent of the current physical location of the physical device. In this manner, a purchaser of a physical device that has an associated virtual device may readily configure the physical device with services obtained via the associated virtual device.

Frequently, shared network printers may have a label taped on them to indicate their network identity so that users can readily identify the printers on a network listing. However, such labels may not be permanently valid. For example, such a label may be invalidated by moving the printer from one physical location to another physical location. Also, when a printer is moved from one location to another, the printer may require a network administrator to set up the printer for the new location.

Sometimes, personal computers have labels affixed to them. Such labels may sometimes remain valid for a variety of locations, but the labels need to be configured to validate the label. A device that needs to be configured may be subject to losing the configuration, thus requiring reconfiguration. In some embodiments, dynamic labels may be provided in the form of beacons or the like, but such a method increases the cost associated with maintaining the device and the complexity of local administration of such maintenance.

Physical devices may be, for example, devices such as a personal digital assistant, a personal computer, a printer, a scanner, a mobile phone, or devices that less frequently are connected to networks, such as clocks, (desk) telephones, home appliances, kitchen appliances, and the like. A Uniform Resource Identifier (URI, sometimes also known as a URL) is a string, generally short, that identifies a resource or resources in the web such as documents, images, downloadable files, services, electronic mailboxes, and the like. The resources may be made available under a variety of naming schemes and access methods such as HyperText Transfer Protocol (HTTP), File Transfer Protocol (FTP), Internet mail addresses, and the like. A "device avatar URI" is defined as a universal resource indicator that may be used to provide a communication path for a physical device that is associated with a selected virtual device (also known as an avatar) via a publicly visible, permanently affixed, human and/or machine readable label. Typically, such a label may be affixed to the physical device during manufacture of the device.

The present invention provides a method and system that combine the service location permanence of a device avatar with the a human and/or machine readable label that is affixed to the device, typically at the time of manufacture. The combination provided by the invention is location independent, universally understandable, and does not require configuration or local maintenance.

As technology progresses, technical solutions are needed to facilitate the new combinations of physical devices and virtual devices that provide services. Such virtual devices that are associated with particular physical devices to provide services to the physical devices are called device avatars. The present invention facilitates communication between the physical devices and their associated virtual counterparts, the device avatars. By affixing a communication identifier to the physical device that allows the physical device to locate, in information space, the device avatar that is associated with the physical device, each physical device is correlated with its associated virtual device without undue difficulty.

A user does not need to seek out a written document, which may have become misplaced or lost, in order to seek or update the services available to the physical device. Though the physical device may have an address that is neither fixed not outwardly identifiable, the present invention provides for affixing the associated avatar's URI to the physical device in a substantially non-removable form so that the physical device may use the URI to communicate with the associated device avatar to obtain services. In one embodiment, the URI may be molded into the case or outer covering of the device. However, the URI may also be painted onto the device, be located on a riveted nameplate, or the like.

As shown in FIG. 1, the present invention provides a method for automatically linking a physical device and a predetermined associated virtual device to facilitate obtaining services for the physical device. The method includes the steps of manufacturing 102 the physical device that is associated with the predetermined virtual device and attaching 104, to the physical device, a substantially unremovable communication identifier for communicating with the predetermined virtual device. Typically, the physical device communicates with the predetermined virtual device over an information space such as the Internet. Upon the physical device's communicating with the predetermined virtual device, the predetermined virtual device may provide at least one predetermined service 106, or alternatively, a selection of services 108. Generally, where a selection of services is provided, a user may select 110 as many services as are desired.

Some physical devices may not be configured to permit ready selection of services. In such a case, an intermediate device may be utilized 112 to allow the physical device to communicate with the predetermined virtual device. For example, a console or computer may be coupled to the physical device and may be used to enter the communication identifier, such as a URI, that is provided on the physical device. The console or computer then communicates with the associated virtual device, determines what service or services are available, and communicates the service or services to the physical device. Clearly, couplings may be wireless or wired.

Any suitable naming scheme may be utilized for the communication identifier. For example, a HyperText Transfer Protocol naming scheme, a File Transfer Protocol naming scheme, or an Internet mail address naming scheme may be used.

Figure 2:
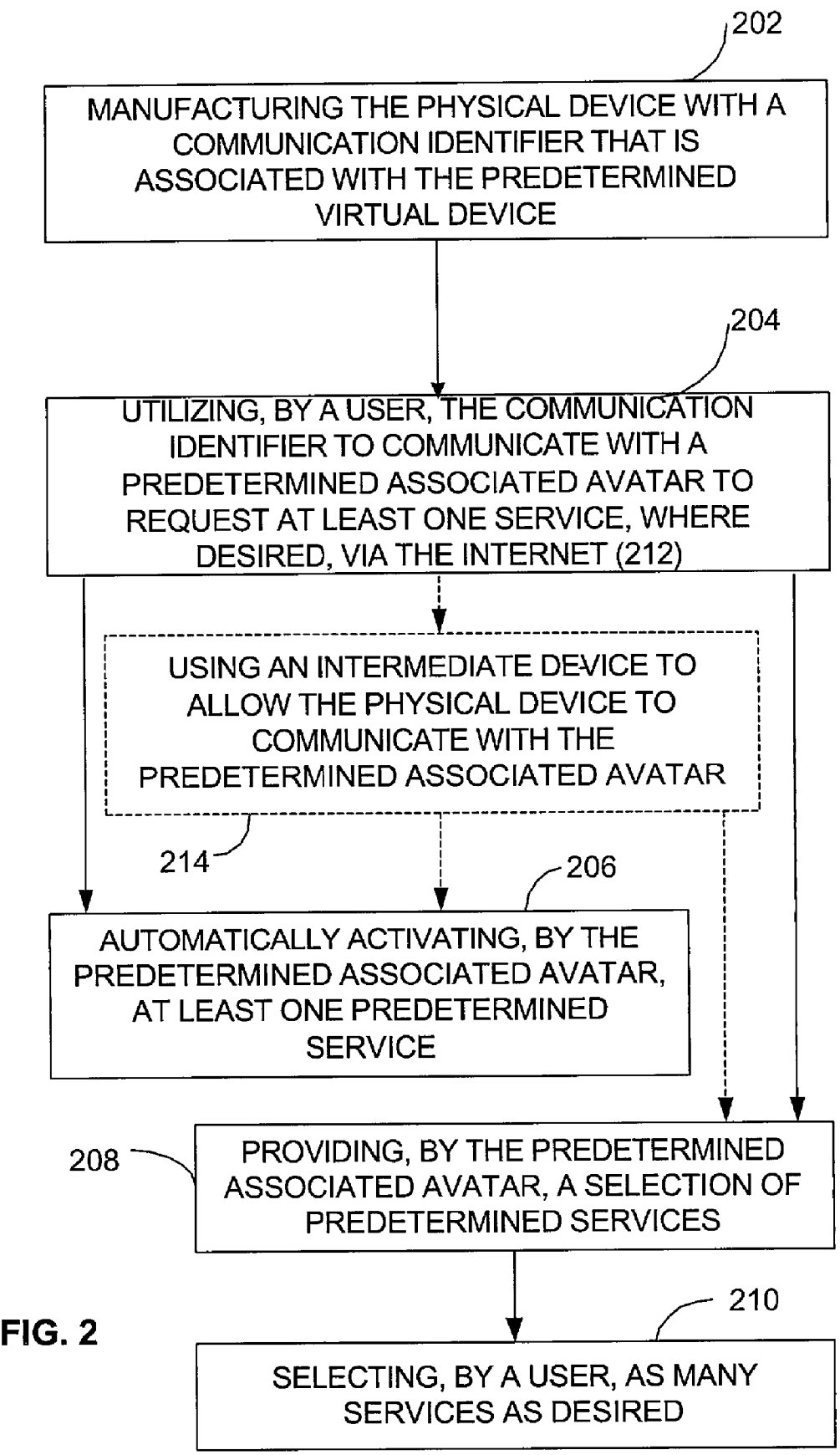
FIG. 2 is a flowchart showing another embodiment of steps in accordance with the method of the present invention.

FIG. 2 illustrates another embodiment of the present invention wherein the method for automatically providing electronic services for a physical device having a substantially non-removable communication identifier includes the steps of manufacturing 202 the physical device with a substantially non-removable communication identifier and utilizing 204, by a user, the communication identifier to communicate with a predetermined associated avatar to request at least one service. The predetermined associated avatar may generally be a virtual unit that has been programmed to identify the physical device and to provide at least one service to the physical device.

In one embodiment, the predetermined associated avatar may automatically activate 206 at least one predetermined service. Also, upon utilizing the communication identifier to communicate with the predetermined associated avatar, the predetermined associated avatar may provide 208 a selection of services from a predetermined list of services. The user typically may select 210 at least one desired service. For example, where the physical device is a cellular telephone, the virtual unit may be arranged to allow the user to select printing out his email messages on a particular printer.

In a preferred embodiment, the physical device may utilize 212 the communication identifier to communicate with the predetermined associated avatar via the Internet. Again, where desired, an intermediate device may be utilized 214 to couple the physical device to the predetermined associated avatar. Typical intermediate devices are consoles and computers.

The communication identifier is generally a Uniform Resource Identifier (URI). URIs provide a simple and extensible way to identify a resource. URIs are characterized using the descriptions set forth below.

"Uniform" allows different types of resource identifiers to be used in the same context, even when the mechanisms used to access those resources may be different. Uniform semantic interpretation of common syntactic conventions may be employed across different types of resource identifiers. New types of resource identifiers may be introduced without interfering with the way that existing identifiers are used. Also, identifiers may be reused in many different contexts so that new applications or protocols may leverage pre-existing, large and widely-used sets of resource identifiers.

A "Resource" is anything that has an identity. Typical resources include electronic documents, images, service (such as reports) and the like. Some resources, such as humans, corporations, and textbooks are not network "retrievable", but are still considered resources. A resource typically is a conceptual mapping to an entity or set of entities, not necessarily the entity that corresponds to that mapping at any particular instance in time. Hence, a resource can remain constant even when its content, i.e., the entities to which it currently corresponds, changes over time, but only if the conceptual mapping is not changed in the process.

An "Identifier" is an object that can act as a reference to something that has identity. Thus, for a URI, the object is a sequence of characters with a restricted syntax.

A URI may be further described as a locator, a name or both. The term "Uniform Resource Locator" (URL) refers to a subset of URIs that identify resources using a representation of their primary access mechanism or "location" in the network. A "Uniform Resource Name" (URN) is the subset of URIs that are required to remain globally unique and persistent even if the resource ceases to exist or becomes unavailable.

A URI may further restrict the syntax and semantics of identifiers for the namespace using the selected scheme. Any workable naming scheme, such as, for example, HyperText Transfer Protocol, File Transfer Protocol, an Internet mail address or the like, may be used for the communication identifier. However, although many resource identifier schemes are named after protocols, this does not imply that the only way to access the URI's resource is via the named protocol.

Figure 3:
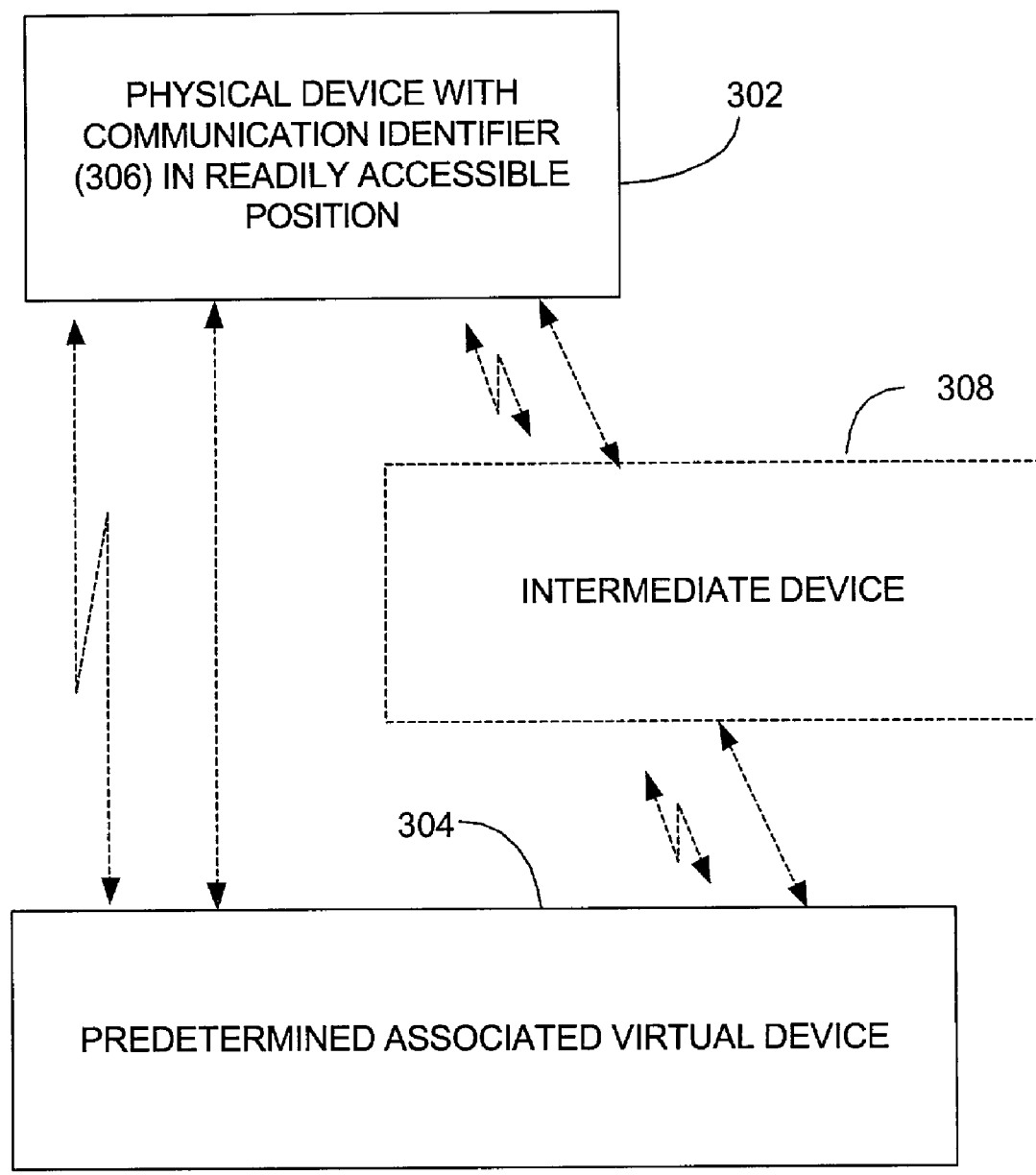
FIG. 3 is a block diagram showing one embodiment of a system in accordance with the present invention.

As shown in FIG. 3, the present invention may be implemented by a system that provides automatic linking of a physical device 302 and a predetermined associated virtual device 304. Generally, the system includes the physical device, which has a substantially unremovable communication identifier 306 in a readily accessible position of the physical device so that a user can either read it or use a machine to read it, and the predetermined associated virtual device. The communication identifier, such as a URI, may be used to communicate with the predetermined associated virtual device. The physical device is arranged to be capable of receiving at least one predetermined service, and the predetermined virtual device is arranged to be accessible by the physical device using the communication identifier and to, upon being accessed by the physical device, provide at least one predetermined service. Communication is generally achieved over an information space such as the Internet.

Alternatively, the system may be arranged to have the predetermined virtual device provide a selection of predetermined services so that the user may select, if desired, more than one service.

The system may further include an intermediate device 308, such as, for example, a console or a computer, that is arranged to facilitate communication between the physical device and the predetermined virtual device. The intermediate device 308 may be arranged to utilize wireless or wired communication with the physical device 302 and/or the predetermined associated virtual device 304, as desired. The communication identifier may typically be a Uniform Resource Identifier with a desired naming scheme such as, for example, a HyperText Transfer Protocol naming scheme, a File Transfer Protocol naming scheme, or an Internet mail address naming scheme.

The predetermined associated virtual device 304 may, for example, be a server, a database, or the like, that provides for storing, and generally facilitating retrieval of, information associated with the physical device 302 and its predetermined associated virtual device 304.

Figure 4:
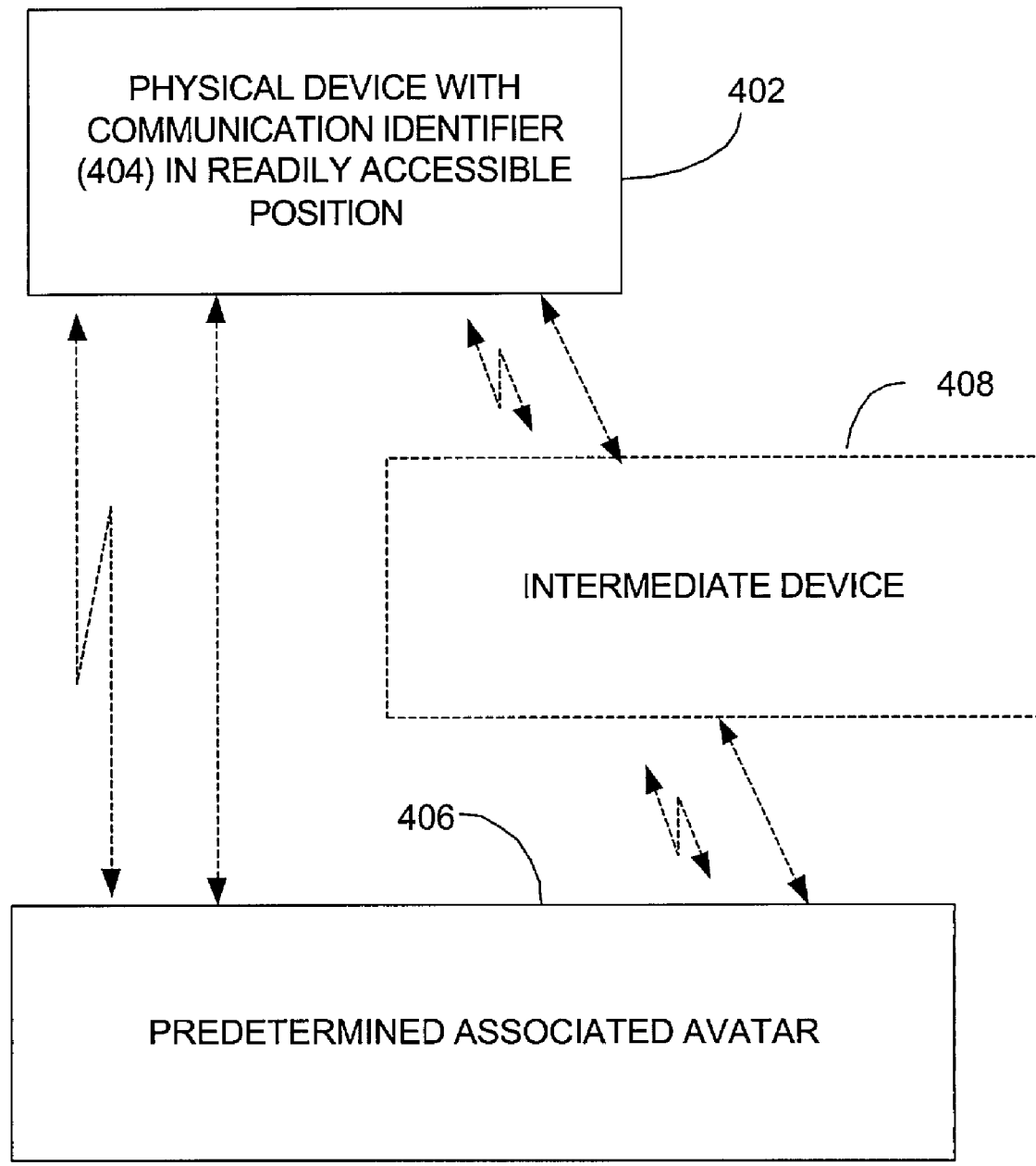
FIG. 4 is a flowchart showing another embodiment of a system in accordance with the present invention.

FIG. 4 shows another embodiment of a system for automatically providing electronic services for a physical device 402 having a substantially non-removable communication identifier 404. The physical device 402 has a substantially non-removable communication identifier 404. The communication identifier 404 is generally located in a readily accessible position of the physical device 402 and may be used for facilitating communication of the physical device 402 with a predetermined associated avatar to request at least one service. A user utilizes the communication identifier 404 to send a request to the predetermined associated avatar 406, which then activates the at least one predetermined service. For example, a URI may be molded into the case of the physical device 402. Where the physical device 402 is, for example, a personal digital assistant (PDA), the user inputs the URI into the PDA, which then connects the PDA to the predetermined associated avatar 406. When the user purchased the PDA, he may have obtained the capability of a service such as directing, using the services at the predetermined associated avatar 406, printing of information from the PDA to a selected printer. Alternatively, he may be able to access and/or activate a selection of a plurality of services via the associated avatar 406 or may be able to select and activate additional services to a service or services that he already purchased. In one embodiment, the user may use the communication identifier 404 to communicate with the predetermined associated avatar 406 via the Internet.

Where, for example, the physical device 402 may not be configured to connect directly to the predetermined associated avatar 406, an intermediate device 408 such as, for example, a console or computer, may be arranged to communicate with the physical device 402 and use the communication identifier 404 to communicate with the predetermined associated avatar 406. For example, where the physical device 402 is a printer, the printer may not have the capability of communicating directly with its predetermined associated avatar 406. Here, the printer may be arranged to communicate with an intermediate device 408, such as a console or a computer, that then uses the communication identifier 404 to communicate with the predetermined associated avatar 406. Again, desired services may be selected and activated using the predetermined associated avatar 406.

The predetermined associated avatar 406 may, for example, be a server, a database, or the like, that provides for storing, and generally facilitating retrieval of, information associated with the physical device 402 and its predetermined associated avatar 406.

As in the above embodiment, the communication identifier may typically be a Uniform Resource Identifier with a desired naming scheme such as, for example, a HyperText Transfer Protocol naming scheme, a File Transfer Protocol naming scheme, or an Internet mail address naming scheme.

Thus, a method and system have been described for facilitating service delivery between a physical device and an associated virtual device according to the present invention. Many modifications and variations may be made to the techniques and structures described and illustrated herein without departing from the spirit and scope of the invention. Accordingly, it should be understood that the method and system described herein are illustrative only and are not limiting upon the scope of the invention.

The invention claimed is:

1. A method for providing for automatic linking of a physical device and a predetermined associated virtual device, comprising the steps of:

manufacturing the physical device that is associated with the predetermined virtual device;

attaching to the physical device a substantially unremovable communication identifier for communicating with the predetermined virtual; and automatically providing to a user updated documentation about, and updated services available for, the physical device through the virtual device.

2. The method of claim 1 further including coupling, over an information space, the physical device to the predetermined virtual device.

3. The method of claim 2 wherein the information space is the Internet.

4. The method of claim 2 further including automatically activating, by the predetermined virtual device, at least one predetermined service.

5. The method of claim 2 further including, upon coupling, over an information space, the physical device to the predetermined virtual device, providing, by the predetermined virtual device, a selection of services.

6. The method of claim 5 further including, selecting, by a user of the physical device, at least one desired service.

7. The method of claim 2 wherein an intermediate device is utilized to couple the physical device to the predetermined virtual device.

8. The method of claim 7 wherein the intermediate device is one of: a console and a computer.

9. The method of claim 1 wherein the communication identifier is a Uniform Resource Identifier.

10. The method of claim 1 wherein the communication identifier utilizes a HyperText Transfer Protocol naming scheme.

11. The method of claim 1 wherein the communication identifier utilizes a Fife Transfer Protocol naming scheme.

12. The method of claim 1 wherein the communication identifier utilizes an Internet mail address naming scheme.

13. A method for automatically providing electronic services for a physical device having a substantially non-removable communication identifier, comprising the steps of:
   manufacturing the physical device with a substantially non-removable communication identifier;
   utilizing, by a user, the communication identifier to communicate with a predetermined associated avatar to request at least one service; and
   automatically providing to a user updated documentation about, and updated services available for, the physical device through a virtual device.

14. The method of claim 13 further including automatically activating, by the predetermined associated avatar, at least one predetermined service.

15. The method of claim 13 further including, upon utilizing the communication identifier to communicate with the predetermined associated avatar, providing, by the predetermined associated avatar, a selection of services.

16. The method of claim 15 further including, selecting, by the user, at least one desired service.

17. The method of claim 13 wherein the physical device utilizes the communication identifier to communicate with the predetermined associated avatar via the Internet.

18. The method of claim 13 wherein an intermediate device is utilized to couple the physical device to the predetermined associated avatar.

19. The method of claim 18 wherein the intermediate device is one of: a console and a computer.

20. The method of claim 13 wherein the communication identifier is a Uniform Resource Identifier.

21. The method of claim 13 wherein the communication identifier utilizes a HyperText Transfer Protocol naming scheme.

22. The method of claim 13 wherein the communication identifier utilizes a File Transfer Protocol naming scheme.

23. The method of claim 13 wherein the communication identifier utilizes an Internet mail address naming scheme.

24. A system for providing for automatic linking of a physical device and a predetermined associated virtual device, comprising:
   the physical device, having a substantially unremovable communication identifier in a readily accessible position of the physical device, wherein the communication identifier facilitates communication with the predetermined associated virtual device, and the physical device is arranged to be capable of receiving at least one predetermined service;
   the predetermined virtual device, arranged to be accessible by the physical device using the communication identifier, for, upon being accessed by the physical device, providing at least one predetermined; and
   automatically providing to a user updated documentation about, and updated services available for, the physical device through the virtual device.

25. The system of claim 24 wherein the physical device communicates with the predetermined virtual device over an information space.

26. The system of claim 25 wherein the information space is the Internet.

27. The system of claim 24 wherein the predetermined virtual device provides a selection of predetermined services.

28. The system of claim 27 wherein more than one predetermined service is activated.

29. The system of claim 24 further including an intermediate device that arranged to facilitate communication between the physical device and The predetermined virtual device.

30. The system of claim 29 wherein the intermediate device is one of: a console and a computer.

31. The system of claim 24 wherein the communication identifier is a Uniform Resource Identifier.

32. The system of claim 24 wherein the communication identifier utilizes a HyperText Transfer Protocol naming scheme.

33. The system of claim 24 wherein the communication identifier utilizes a File Transfer Protocol naming scheme.

34. The system of claim 24 wherein the communication identifier utilizes an Internet mail address naming scheme.

35. A system for automatically providing electronic services for a physical device, comprising:
   the physical device, having a substantially non-removable communication identifier;
   the communication identifier, located in a readily accessible position of the physical device, for facilitating communication of the physical device with a predetermined associated avatar to request at least one service; and
   an updater configured to automatically provide to a user updated documentation about, and updated services available for, the physical device through a virtual device.

36. The system of claim 35 wherein the predetermined associated avatar, upon receiving the request, activates the at least one predetermined service.

37. The system of claim 35 wherein the predetermined associated avatar, upon receiving the request, provides a selection of predetermined services.

38. The system of claim 37 wherein more than one of the selection of predetermined services is selected and activated.

39. The system of claim 35 wherein the physical device utilizes the communication identifier to communicate with the predetermined associated avatar via the Internet.

40. The system of claim 35 further including an intermediate device that is arranged to be utilized by the physical device to access the predetermined associated avatar, wherein the intermediate device is utilized to couple the physical device to the predetermined associated avatar.

41. The system of claim 40 wherein the intermediate device is one of: a console and a computer.

42. The system of claim 35 wherein the communication identifier is a Uniform Resource Identifier.

43. The system of claim 35 wherein the communication identifier utilizes a HyperText Transfer Protocol naming scheme.

44. The system of claim 35 wherein the communication identifier utilizes a File Transfer Protocol naming scheme.

45. The system of claim 35 wherein the communication identifier utilizes an Internet mail address naming scheme.

* * * * *

UNITED STATES PATENT AND TRADEMARK OFFICE
CERTIFICATE OF CORRECTION

PATENT NO.         : 7,093,007 B2
APPLICATION NO.    : 10/029338
DATED              : August 15, 2006
INVENTOR(S)        : Charles M. Patton et al.

It is certified that error appears in the above-identified patent and that said Letters Patent is hereby corrected as shown below:

In column 6, line 67, in Claim 1, delete "virtual;" and insert -- virtual device; --, therefor.

In column 7, line 29, in Claim 11, delete "Fife" and insert -- File --, therefor.

In column 8, line 16, in Claim 24, delete "predetermined;" and insert -- predetermined service; --, therefor.

In column 8, line 33, in Claim 29, after "and" delete "The" and insert -- the --, therefor.

Signed and Sealed this

Fifth Day of May, 2009

JOHN DOLL
*Acting Director of the United States Patent and Trademark Office*